United States Patent
Waxman (10) Patent No.: US 7,447,979 B2
(45) Date of Patent: Nov. 4, 2008

(54) DEVICE, SYSTEM AND METHOD OF DETECTING ERRONEOUS PACKETS

(75) Inventor: Shai Waxman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 627 days.

(21) Appl. No.: 11/028,046

(22) Filed: Jan. 4, 2005

(65) Prior Publication Data

US 2006/0150064 A1  Jul. 6, 2006

(51) Int. Cl.
*H03M 13/00* (2006.01)
(52) U.S. Cl. ..................................... 714/776
(58) Field of Classification Search .................. 714/776
See application file for complete search history.

(56) References Cited

U.S. PATENT DOCUMENTS

| | | | |
|---|---|---|---|
| 6,367,048 B1 * | 4/2002 | McAuliffe et al. | 714/758 |
| 6,738,369 B1 * | 5/2004 | Hippelainen | 370/349 |
| 6,873,618 B1 * | 3/2005 | Weaver | 370/390 |
| 7,318,187 B2 * | 1/2008 | Vayanos et al. | 714/776 |
| 2003/0233576 A1 * | 12/2003 | Maufer et al. | 713/201 |

* cited by examiner

*Primary Examiner*—Guy J Lamarre
(74) *Attorney, Agent, or Firm*—Pearl Cohen Zedek Latzer, LLP (57) ABSTRACT

Embodiments of the present invention provide a method, apparatus and system for acquiring, by a communication device, an address sequence of an acquired packet transmitted over a communication channel and determining whether to receive the acquired packet. The method involves comparing the address sequence with one or more address sequences of previously-acquired packets stored in an address list. Then, if the address sequence does not appear in the address list, the address sequence is stored in the list. If the address sequence of the packet, match an address sequence stored in the address list, the packet is received and the and further checked to determine whether the address sequence of the packet is erroneous. Other embodiments are described and claimed.

31 Claims, 4 Drawing Sheets

DEVICE, SYSTEM AND METHOD OF DETECTING ERRONEOUS PACKETS

BACKGROUND OF THE INVENTION

A wireless communication device may include a receiver to receive signals over a communication channel. The receiver may operate at an acquisition mode of operation, e.g., to detect (i.e., acquire) communication packets over the communication channel. After acquiring a communication packet, the receiver may switch to a receive mode of operation to receive the acquired packet.

In some cases, the receiver may misidentify interference signals, e.g., noise signals, as communication packets. Consequently, the receiver may switch to the receive mode of operation and receive the noise signals ("noise-related packets") as communication packets.

After receiving the packet, the communication device may perform an error check, for example, a Cyclic Redundancy Check (CRC), to determine whether the received packet is erroneous. However, a relatively long time period, e.g., approximately 1 millisecond, may be invested in receiving the packet before the received packet may be determined to be erroneous. During this time period, the receiver may not be able to acquire another packet. Consequently, the throughput of the communication device may decrease, often significantly, for example, in the vicinity of a persistent noise source.

In some systems, the communication device may perform a parity check to determine whether the acquired packet is erroneous, e.g., based on a Physical Layer Convergence Procedure (PLCP) header of the acquired packet. A parity checker of the communication device may calculate a parity check value of the PLCP header and may compare the calculated parity check value to a parity check bit of the PLCP header. A mismatch between the calculated parity check value and the parity check bit may indicate the acquired packet is an erroneous packet. In such a case, the receiver may switch back to the acquisition mode of operation, e.g., before the entire packet is received. However, since the parity check bit has only two possible values, e.g., zero or one, there may be a probability of up to 50% that an acquired packet passing the parity check is actually a noise-related packet.

BRIEF DESCRIPTION OF THE DRAWINGS

The subject matter regarded as the invention is particularly pointed out and distinctly claimed in die concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices In addition, the term "plurality" may be used throughout the specification to describe two or more components, devices, elements, parameters and the like.

It should be understood that the present invention may be used in a variety of applications Although the present invention is not limited in this respect, the circuits and techniques disclosed herein may be used in many apparatuses such as units of a wireless communication system, for example, a Wireless Local Area Network (WLAN) communication system and/or in any other unit and/or device Units of a WLAN communication system intended to be included within the scope of the present invention include, by way of example only, modems, Mobile Units (MU), Access Points (AP), wireless transmitters/receivers, and the like.

Types of WLAN communication systems intended to be within the scope of the present invention include, although are not limited to, WLAN communication systems as described by "IEEE-Std 802.11, 1999 Edition (ISO/IEC 8802-11: 1999)" standard ("the 802.11 standard"), and more particularly in "IEEE-Std 802.11a-1999 Supplement to 802.11-1999: Wireless LAN MAC and PHY specifications: Higher speed Physical Layer (PHY) extension in the 5 GHz band", "IEEE-Std 802.11b-1999 Supplement to 802.11-1999, Wireless LAN MAC and PHY specifications: Higher speed Physical Layer (PHY) extension in the 2.4 GHz band", and "IEEE-Std 8020.11g-2003 Supplement to 802.11-1999, Wireless LAN MAC and PHY specifications: Further Higher Data Rate Extension in the 2.4 GHz band, Draft 8.2", and the like.

Although the scope of the present invention is not limited in this respect, the circuits and techniques disclosed herein may also be used in units of wireless communication systems, digital communication systems, satellite communication systems and the like.

Devices, systems and methods incorporating aspects of embodiments of the invention are also suitable for computer communication network applications, for example, intranet and Internet applications. Embodiments of the invention may be implemented in conjunction with hardware and/or software adapted to interact with a computer communication network, for example, a LAN, wide area network (WAN), or a global communication network, for example, the Internet.

Part of the discussion herein may relate, for exemplary purposes, to acquiring and/or receiving a packet over a channel. However, embodiments of the invention are not limited in this regard, and may include, for example, receiving and/or acquiring a signal, a block, a data portion, a data sequence, a frame, a data signal, a preamble, a signal field, a content, an item, a message, a protection frame, or the like.

Figure 1:
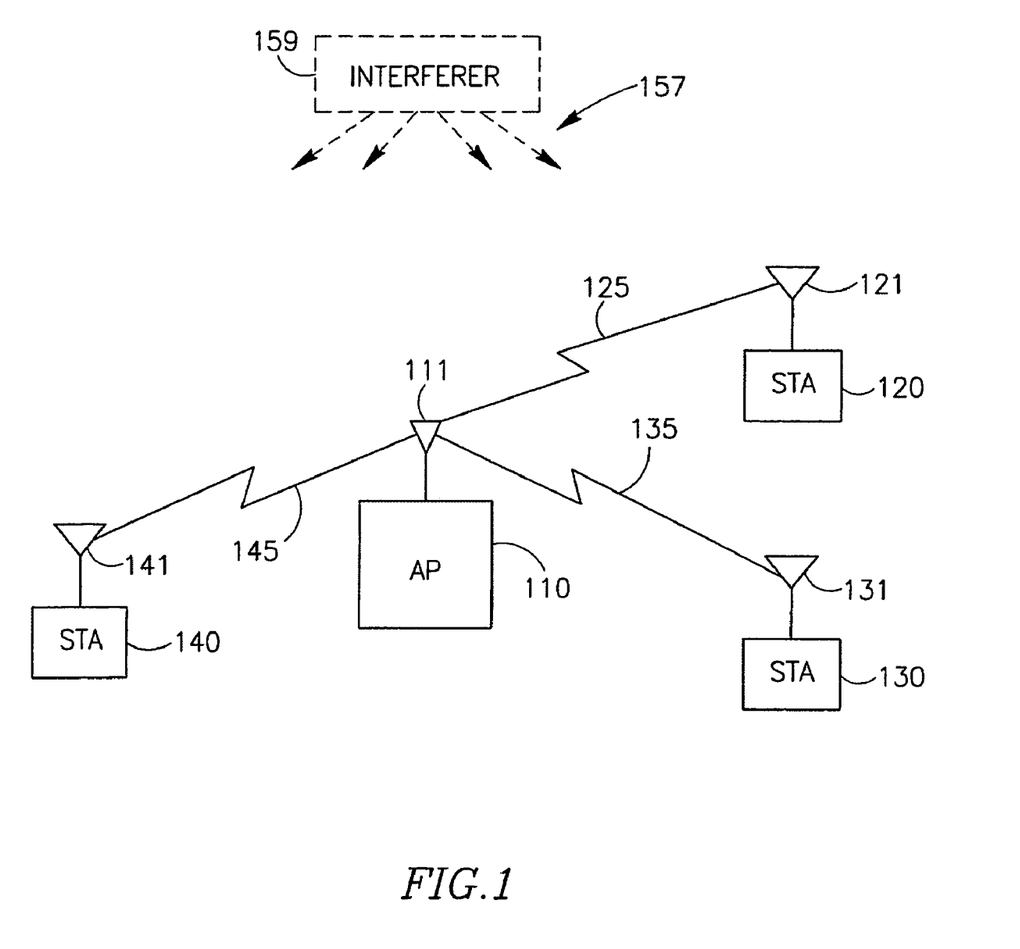
FIG. 1 is a schematic diagram of a wireless communication system in accordance with some exemplary embodiments of the present invention.

Reference is made to FIG. 1, which schematically illustrates a wireless communication system 100 in accordance with an embodiment of the present invention.

In some exemplary embodiments of the invention, communication system 100 may include a WLAN system. Although the scope of the present invention is not limited in this respect, communication system 100 may be defined, e.g., by the 802.11 standard, as a Basic Service Set (BSS). For example, the BSS may include at least one communication station, for example, an AP 110, and stations 120, 130 and 140, at least one of which may be a MU. In some embodiments, stations 140, 130 and 120 may transmit and/or receive one or more packets over wireless communication system 100. The packets may include data, control messages, network information, and the like. Additionally or alternatively, in other embodiments of the present invention, wireless communication system 100 may include two or more APs and two or more mobile stations, in which case wireless communication system 100 may be referred to as an extended service set (ESS), as defined by the 802.11 standard, although the scope of the present invention is not limited in this respect.

According to exemplary embodiments of the invention, AP 110 may include one or more antennas 111 for transmitting and/or receiving packets, e.g., to/from stations 120, 130 and/or 140. Stations 120, 130 and/or 140 may include one or more antennas 121, 131 and/or 141, respectively, for transmitting and/or receiving packets, e.g., to/from AP 110. Although the scope of the present invention is not limited in this respect, types of antennae that may be used for antennas 111, 121, 131, and/or 141 may include but are not limited to internal antenna, dipole antenna, omni-directional antenna, a monopole antenna, an end fed antenna, a circularly polarized antenna, a micro-strip antenna, a diversity antenna and the like.

According to some exemplary embodiments of the invention, at least one noise generator 159 (hereinafter also referred to as "interferer") may generate noise signals 157, which may be received by one or more of stations 120, 130 and 140. Interferer 159 may include a random interferer generating random noise signals 157, e.g., noise signals having a generally random value. Additionally or alternatively, interferer 159 may include a non-random interferer, e.g., a periodic interferer, generating non-random noise signals 157, for example, including a sequence of noise patterns having similar, e.g., substantially identical, values.

It will be appreciated that the term "noise-related packet" as used herein may refer to a packet-like sequence of noise signals, e.g., noise signals 157, as detected (i.e., acquired) by a communication device, e.g., station 120, 130 or 140.

It will be appreciated that the term "address sequence" as used herein may refer to a sequence of bits normally intended to identify an acquired packet, e.g., an address sequence of the acquired packet. For example, an address sequence of a communication packet transmitted by a communication device, e.g., by AP 110, may include a sequence of bits representing an address of the transmitting communication device, e.g., AP 110. A "noise-related address sequence" may refer to a sequence of bits within a noise-related packet in the position normally used for the address sequence. Therefore, a conventional communication device receiving noise-related signals may attempt to analyze the noise-related address sequence as an address sequence of a legitimate communication packet.

According to some exemplary embodiments of the invention, one or more of communication stations 120, 130 and 140 may be able to acquire a packet and to determine whether the acquired packet is erroneous, e.g., by determining whether an address sequence of the acquired packet is erroneous. Determining whether the address sequence of the acquired packet is erroneous may include, for example determining whether the address sequence of the acquired packet corresponds to an address sequence of a previously acquired packet, as described below This determination may be performed before the acquired packet is received, e.g., before the acquired packet is received in its entirety.

According to exemplary embodiments of the invention, AP 110 may include suitable WLAN AP communication circuitry, for example, AP circuitry able to operate in accordance with the 802.11 standard and/or any other suitable standard. For example, AP 110 may be able to control communication between AP 110 and stations 120, 130 and/or 140 by sending management commands, e.g., via beacons 125, 135, 145, if desired.

Figure 2:
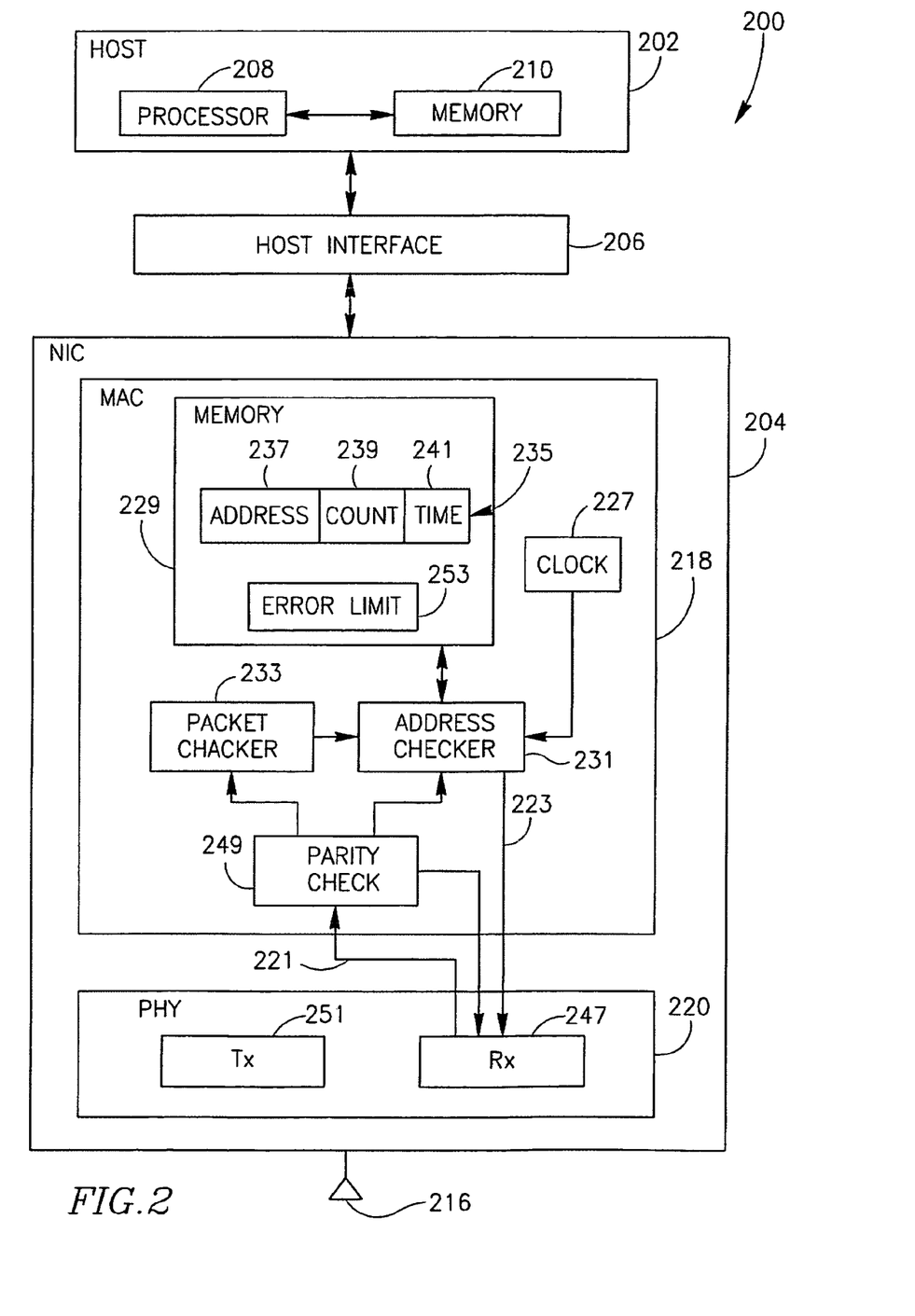
FIG. 2 is a schematic illustration of a communication station in accordance with some exemplary embodiments of the invention.

Reference is made to FIG. 2, which schematically illustrates a station 200 in accordance with some exemplary embodiments of the invention. Although the invention is not limited in this respect, station 200 may perform the functionality of at least one of stations 120, 130 and 140 (FIG. 1).

According to exemplary embodiments of the invention, station 200 may include a host 202 associated with a wireless communication module, e.g., a Network Interface Card (NIC) 204, for example, via a host interface 206, as described in detail below.

In some embodiments, host 202 may include or may be, for example, a computing platform, e.g., a personal computer, a desktop computer, a mobile computer, a laptop computer, a notebook computer, a terminal, a workstation, a server computer, a Personal Digital Assistant (PDA) device, a tablet computer, a network device, or other suitable computing device.

According to some exemplary embodiments of the invention, host 202 may include a processor 208, which may be associated with a memory 210. Memory 210 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Processor 208 may include, for example, a Central Processing Unit (CPU), a Digital Signal Processor (DSP), a microprocessor, a host processor, a plurality of processors, a controller, a chip, a microchip, or any other suitable multi-purpose or specific processor or controller. Processor 208 may be able to process reception (Rx) signals, e.g., corresponding to signals which may be received via at least one antenna 216, and/or transmission (Tx) signals intended for transmission via antenna 216, e.g., as is known in the art.

Host interface 206 may include any suitable hardware and/or circuitry, e.g., as known in the art, for providing NIC 204 with signals received from processor 208 in a format suitable for NIC 204, and/or for providing host 208 with signals received from NIC 204 in a format suitable for processor 208.

According to some exemplary embodiments of the invention, NIC 204 may include a Media Access Control (MAC) module 218 associated with host interface 206, and a Physical (PHY) layer 220 associated with MAC 218 and antenna 216.

PHY 220 may include a receiver 247 for receiving one or more signals, e.g., via antenna 216, and producing one or more corresponding Rx signals 221. According to some embodiments of the invention, receiver 247 may have at least two modes of operation; namely, an acquisition mode, in which the receiver may attempt to detect (i.e., acquire) packets and other signals over a communication channel, e.g., as is known in the art, and a receive mode, in which the receiver may receive the content of acquired packets, as discussed below. MAC 218 may be able to cause receiver 247 to switch between modes of operation, e.g., between the acquisition and the receive modes of operation, as described below. In some embodiments, receiver 247 may not be able to acquire new signals and/or packets during the receive mode of operation.

PHY 220 may also include a transmitter 251 able to modulate Tx signals from MAC 218, and transmit the modulated signals and/or other signals, via antenna 216, e.g., as is known in the art Transmitter 251 may include any suitable circuitry and/or hardware, e.g., as is known in the art.

According to some exemplary embodiments of the invention, MAC 218 may include a parity check module 249 for checking a Physical Layer Convergence Procedure (PLCP) header of an acquired packet, e.g., as is known in the art. For example, parity check module 249 may calculate a parity check value of the PLCP header and may compare the calculated parity check value with the value of a parity check bit of the PLCP header, as is known in the art. Based on the parity check, module 249 may determine whether the acquired packet is erroneous, e.g., noise-related. For example, if the parity check of the acquired packet fails, module 249 may cause receiver 247 to switch back to the acquisition mode of operation, e.g., using suitable control signals.

According to some exemplary embodiments of the invention, MAC 218 may be able to determine whether the acquired packet is erroneous, e.g., noise-related, for example, before completely receiving the acquired packet, e.g., before receiving a Cyclic Redundancy Check (CRC) field of the acquired packet, as described below.

According to exemplary embodiments of the invention, MAC 218 may also include an address checker 231 including any suitable hardware and/or software for determining whether the acquired packet is noise-related by determining whether the address sequence of the acquired packet is erroneous. For example, address checker 231 may determine whether the address sequence of the acquired packet corresponds to an address sequence ("the previous address sequence") of a packet previously acquired by receiver 247, as described below. Address checker 231 may also be able to selectively cause receiver 247 to switch to the acquisition mode of operation, e.g., using control signals 223, for example, if the acquired packet is determined to be erroneous, as described below.

According to some exemplary embodiments of the invention, MAC 218 may also include a memory 229 to store information relating to one or more address sequences of previously acquired packets, as described below. For example, memory 229 may include an address list 235, e.g., in the form of a database, for storing one or more address sequences 237; and one or more address-error counters 239, and/or one or more time-stamps 241 corresponding to the one or more address sequences 237, respectively, as described below. Memory 229 may also include a predetermined address-error limit value 253, as described below.

According to some exemplary embodiments of the invention, MAC 218 may also include a clocking module 227, e.g., as is known in the art.

According to some exemplary embodiments of the invention, address checker 231 may be able to compare the address sequence of the acquired packet with one or more of the address sequences of the previously acquired packets, e.g., the address sequences stored in address list 235. Address checker 231 may also be able to cause receiver 247 to switch to the acquisition mode of operation if the address sequence of the acquired packet does not match any one of the stored address sequences. Thus, if there is no match, address checker 231 may be able to cause receiver 247 to switch to the acquisition mode of operation, for example, before receiving other portions, e.g., a data portion or a CRC field, of the acquired packet, as described below According to some exemplary embodiments, address checker 231 may be able to update address list 235 with the address sequence of the acquired packet, e.g., if the address sequence of the acquired packet does not match any one of the address sequences stored in address list 235, Address checker 231 may also be able to update a time-stamp, e.g., time-stamp 241, of a stored address sequence matching the address sequence of the acquired packet, to have a value corresponding to a current time, which may be generated by clocking module 227, as described below.

It may be desired, e.g., in order to prevent overflow of memory 229, to selectively delete (i.e., flush) one or more of the stored address sequences and corresponding time stamps and counter values, e.g., address sequences/time stamps/counter values that are not updated during a predetermined flush period. Thus, according to some exemplary embodiments of the invention, address checker 231 may be able to selectively flush one or more of the stored address sequences, e.g., based on the time stamp of the stored address sequences. For example, address checker 231 may be able to delete an address sequence 237 having a time stamp 241 differing by at least the flush period from the current time, which may be generated by clocking module 227.

According to some exemplary embodiments of the invention, receiver 247 may remain in the receive mode of operation and receive the acquired packet, e.g., if the acquired packet is not determined by address checker 231 to be erroneous.

MAC 218 may also include a packet-checking module 233, e.g., a CRC module as is known in the art, to determine whether the received packet is erroneous, e.g., noise-related. For example, module 233 may calculate a CRC value of the received packet and compare the calculated CRC value with the value of a CRC field of the received packet, as is known in the art. The received packet may be provided to host 202, e.g., if the calculated CRC value matches the value of the CRC field. The received packet may be determined to be erroneous, e.g., noise related, for example, if the calculated CRC value does not match the value of the CRC field.

According to some exemplary embodiments of the invention, some noise signals may include non-random noise signals, e.g., periodic noise signals. It is appreciated that a periodic noise signal may include a sequence of noise patterns having similar, e.g., substantially identical, values. For example, a non-random interferer, e.g., interferer 159 (FIG. 1), may repeatedly, e.g., periodically, generate very similar, e.g., substantially identical noise patterns. Thus, an address sequence of an acquired noise-related packet, e.g., resulting from a non-random noise signal, may match an address sequence, e.g., stored in memory 229, of a previously acquired noise-related packet. However, such noise signal may be later detected by the CRC, e.g., after receiving the acquired packet.

According to some exemplary embodiments of the invention, address checker 231 may be able to determine whether the acquired packet is noise-related, e.g., based on the number of occurrences during a predetermined time period, of previously received packets having an address sequence matching the address sequence of the acquired packet and failing the packet check, as described in detail below.

According to some exemplary embodiments of the invention address checker 231 may be able to update an address-error counter value corresponding to a stored address sequence matching the address sequence of the acquired packet, e.g., based on an error check of a received packet corresponding to the address sequence of the received packet. For example, address checker 231 may be able to reset address-error counter value 239 to a predetermined default value, e.g., zero, if the received packet passes the error check of module 233, as described below. Address checker 231 may also be able to update address-error counter value 239 according to a number of occurrences of the address sequence of the received packet if the received packet fails the error check. For example, address checker 231 may increase/decrease the value of counter 239 by a predetermined value, e.g., one, if the received packet fails the error check, as described below.

According to some exemplary embodiments of the invention, address checker 231 may be able to cause receiver 247 to switch to the acquisition mode of operation, for example, if the address-error counter value corresponding to a stored address sequence matching the address sequence of the received packet reaches address-error limit value 253, as described below.

Figure 3:
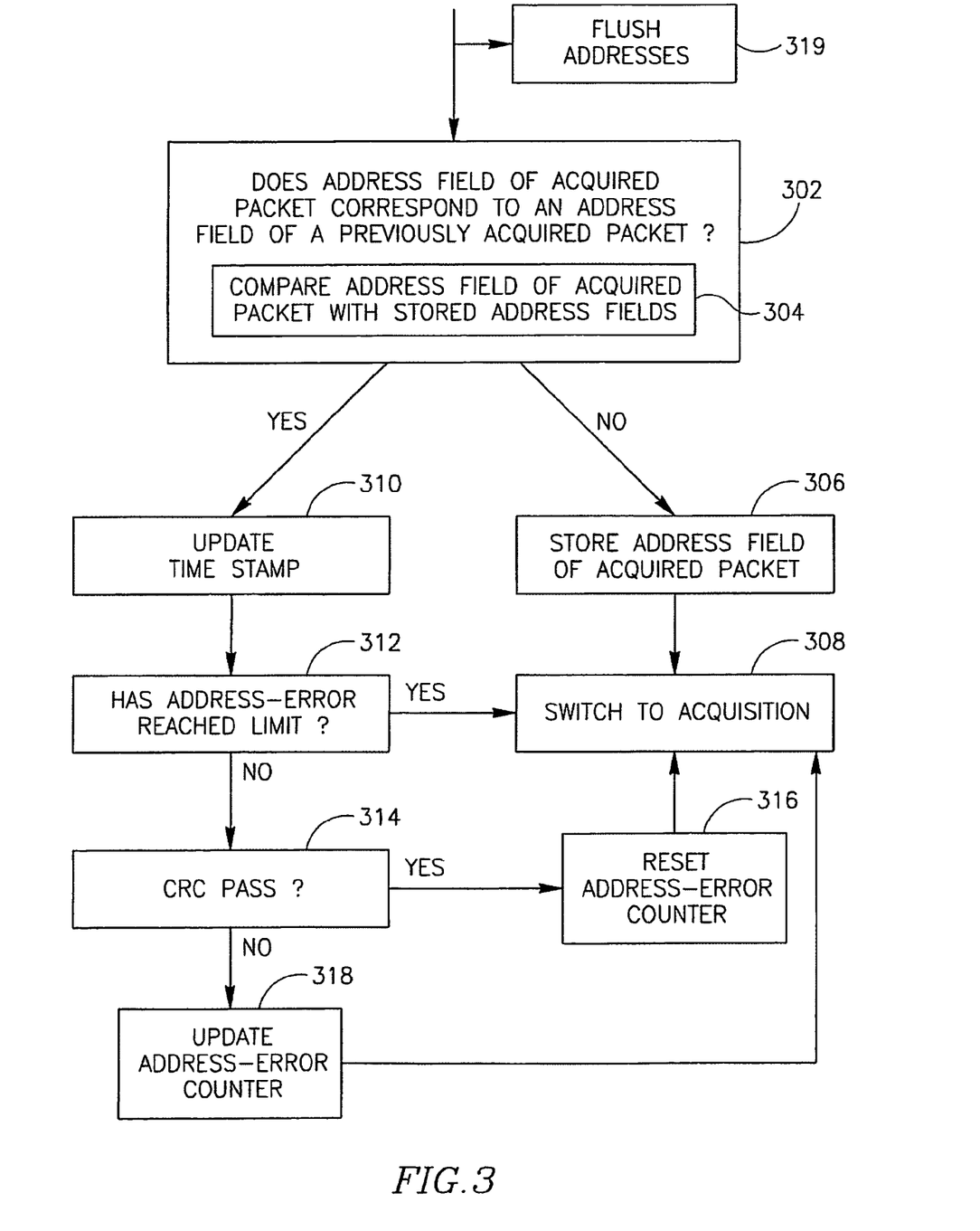
FIG. 3 is a schematic illustration of a flow chart of a method for detecting erroneous packets in accordance with some exemplary embodiments of the invention.

Reference is made to FIG. 3, which schematically illustrates a method of detecting erroneous packets in accordance with some exemplary embodiments of the invention.

Although the present invention is not limited in this respect, the method of FIG. 3 may be implemented by address checker 231 (FIG. 2), e.g., to determine whether an acquired packet may be erroneous, e.g., noise-related.

According to some exemplary embodiments of the invention, some noise signals, e.g., noise signals produced by interferer 159 (FIG. 1), may include random noise signals. Statistically, it is most probable that two or more random noise signals will have different values, even within a relatively short time period. Accordingly, it may be most probable that an address sequence of an acquired packet matching one or more address sequences of previously acquired packets, e.g., stored in memory 229 (FIG. 2), is not related to a random-noise signal. Thus, according to exemplary embodiments of the invention, it may be desired to compare the address sequence of the acquired packet to the one or more stored address sequences, e.g., in order to determine whether the acquired packet is noise-related, as described below.

As indicated at block 302, the method may include determining whether an acquired packet is noise-related by determining whether an address sequence of the acquired packet corresponds to an address sequence of a packet previously acquired, e.g., during a predetermined time period. Determining whether the address sequence of the acquired packet corresponds to the address sequence of the previously acquired packet may include comparing the address sequence of the acquired packet to one or more stored address sequences, as indicated at block 304. For example, address checker 231 (FIG. 2) may receive the address sequence of the acquired packet, and may compare the received address sequence to one or more address sequences 237.

As indicated at block 306, the method may include storing the address sequence of the acquired packet, e.g., if the address sequence of the acquired packet does not match any one of the stored address sequences. For example, address checker 231 (FIG. 2) may store the address sequence of the acquired packet in memory 229, e.g., in list 235, if the address sequence of the acquired packet does not match any one of the address sequences stored in memory 229. Address checker 231 may also store a time stamp and an address-error counter value corresponding to the address sequence of the acquired packet. For example, the time stamp may have a value corresponding to the current time as provided by module 227, and the address-error counter value may be set to the default counter value.

As indicated at block 308, the method may also include switching to an acquisition mode of operation, e.g., if the address sequence of the acquired packet does not match any one of the stored address sequences, since lack of a match may indicate that the acquired packet is erroneous, e.g., noise-related. Accordingly, the method may include switching to the acquisition mode of operation before receiving other portions, e.g., a data portion and/or a CRC field, of the acquired packet.

As indicated at block 310, the method may include updating a time-stamp of a stored address sequence matching the address sequence of the acquired packet. For example, if the address sequence of the acquired packet matches stored address sequence 237, then address checker may update time stamp 241 according to the value of a current time, e.g. from clocking module 227.

As indicated at block 312, the method may include determining whether the address-error counter value corresponding to the address sequence of the acquired packet has reached the address-error limit value. The address-error limit value may be set, for example, based on a predetermined number of occurrences of address sequences of erroneous packets that may be allowed, e.g., during the flush time period. For example, address checker 231 may compare the address-error counter value, e.g., value 239, corresponding to the address sequence of the acquired packet, e.g., address sequence 237, to the limit value 253. According to some exemplary embodiments of the invention, address checker 231 may be able to flush, e.g., after a predetermined time-out period, one or more stored address sequences corresponding to address-error counter values that have reached the limit value, as indicated at block 319.

The acquired packet may be determined to be erroneous, e.g., noise related, if the address-error counter value corresponding to the address sequence of the acquired packet has reached the address-error limit value, Thus, as indicated at block 308, the method may include switching to the acquisition mode of operation, e.g., if the address-error counter value has reached the address-error limit value.

According to exemplary embodiments of the invention, receiver 247 may continue to receive the acquired packet, for example, if receiver 247 is not switched to the acquisition mode of operation, e.g., in response to the address comparison at address checker 231. In the continued receive mode of operation, module 233 may perform an error check, e.g., a CRC, on the received packet.

As indicated at block 314, the method may include updating the address-error counter value corresponding to the address sequence of the acquired packet, e.g., based on the error check of the received packet. For example, address-checker 231 may update counter 239 based on the CRC, e.g., from module 233, of the received packet.

As indicated at block 318 the method may include updating the address-error counter value according to the number of occurrences of the address sequence of the acquired packet, e.g., if the received packet fails the error check. For example, address checker 231 may increase/decrease the value of counter 239 by a predetermined value, e.g., one, if the CRC, e.g., received from module 233, of the received packet indicates the received packet has failed the error check.

According to some exemplary embodiments of the invention, it may be desired, e.g., if the received packet has passed the error check, to reset the address-error counter value corresponding to the address sequence of the acquired packet in order, to prevent the address-error counter from reaching the error-address limit value. Thus, as indicated at block 316, the method may include resetting the address-error counter value corresponding to the address sequence of the acquired packet to the default counter value, e.g., zero, if the received packet passes the error check.

Any combination of one or more of the actions described above with reference to FIG. 3 may be implemented in accordance with exemplary embodiments of the present invention, e.g., in the same order as that illustrated in FIG. 3 or in any other suitable order. Additionally or alternatively, other suitable actions or series of actions may be used in implementing principles of the invention.

Figure 4:
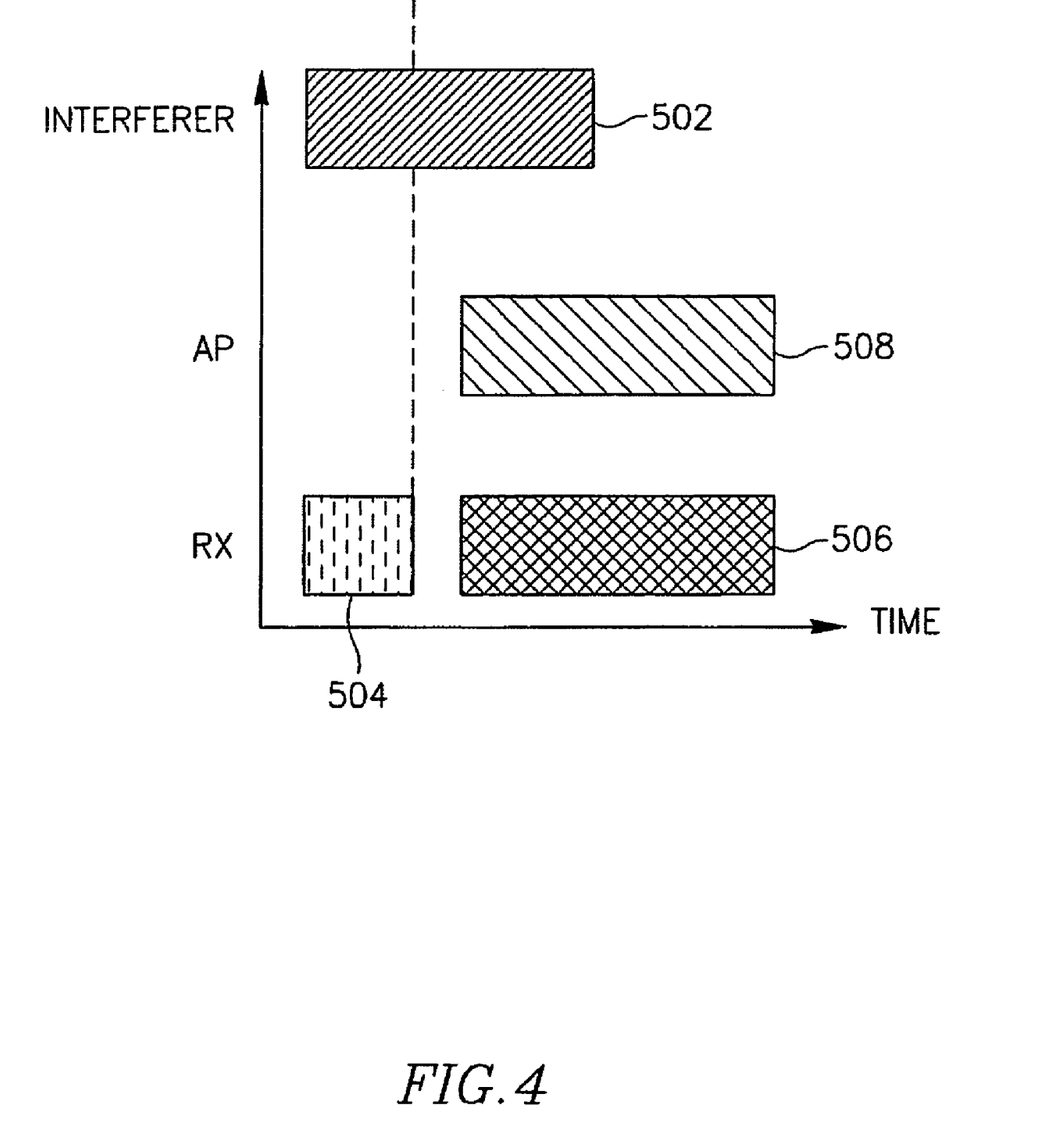
FIG. 4 is conceptual illustration of a sequence of timing diagrams helpful in demonstrating various stages in the method of FIG. 3.

Reference is made to FIG. 4, which conceptually illustrates a sequence of timing diagrams, which may be helpful in demonstrating various stages in the method of FIG. 3.

According to the exemplary embodiments of FIG. 4, at least one potential interferer 159 (FIG. 1), which may include a random and/or non-random interferer, may generate noise signals during a packet-like time period 502, which may at least roughly correspond to a time period for receiving a packet, e.g., approximately one millisecond. An AP, e.g., AP 110 (FIG. 1), may transmit a packet during a time period 508. The packet may be potentially received by a receiver, e.g., receiver 247 (FIG. 2), during a legitimate packet time period 506, which may at least partially overlap time period 502. It will be appreciated by those skilled in the art that a receiver, e.g., receiver 247 (FIG. 2) may not be able to acquire the packet transmitted by the AP, e.g., if the receiver is not switched to the acquisition mode of operation before the beginning of time period 506.

Receiver 247 (FIG. 2) may acquire the noise signals, and switch to the receive mode of operation. Receiver 247 (FIG. 2) may acquire some of the noise signals during an address-check time period 504, during which address checker 231 (FIG. 2) may determine whether the acquired signals are noise-related, for example, by comparing an address sequence represented by the acquired signals to one or more stored address sequences 237 (FIG. 2), and/or by determining whether an address-error counter value corresponding to the address sequence of the acquired signals has reached a limit value, e.g., as described above with reference to FIG. 3. Address checker 231 (FIG. 2) may cause receiver 247 (FIG. 2) to switch to the acquisition mode of operation during address-check time period 540, e.g., if the acquired signals are determined to be noise-related. Receiver 247 (FIG. 2) may not be able to acquire a new packet during address-check time period 504. However, according to exemplary embodiments of the invention, address-check time period 504 may be relatively short, e.g., compared to the packet-like time period 502. In some embodiments, address-check time period 504 may correspond, for example, to the time required for receiving the PLCP header of a packet and an address sequence of a packet, e.g., approximately 40 microseconds. Accordingly, address checker 231 (FIG. 2) may cause receiver 247 (FIG. 2) to switch to the acquisition mode of operation before the beginning of time period 506. As a result, receiver 247 (FIG. 2) may be able to acquire and receive, during time period 506, the packet transmitted by the AP.

Embodiments of the present invention may be implemented by software, by hardware, or by any combination of software and/or hardware as may be suitable for specific applications or in accordance with specific design requirements. Embodiments of the present invention may include units and sub-units, which may be separate of each other or combined together, in whole or in part, and may be implemented using specific, multi-purpose or general processors, or devices as are known in the art. Some embodiments of the present invention may include buffers, registers, storage units and/or memory units, for temporary or long-term storage of data and/or in order to facilitate the operation of a specific embodiment.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method comprising:
   acquiring, by a communication device, an address sequence of an acquired packet transmitted over a communication channel; and
   determining whether to receive the acquired packet by:
   comparing the address sequence with one or more address sequences of previously-acquired packets stored in an address list;
   receiving said acquired packet and determining whether the address sequence of said acquired packet is erroneous, if the address sequence of the packet matches one of said one or more address sequences stored in the address list; and
   storing the address sequence in the list and switching to an acquisition mode of operation, if the address sequence does not match any one of said one or more address sequences stored in the address list.

2. The method of claim 1, comprising performing an error check of the acquired packet after receiving the packet.

3. The method of claim 2, comprising:
   updating an address-error counter value corresponding to an address sequence stored in the address list that matches the address sequence of said acquired packet based on a result of the error check.

4. The method of claim 3, wherein updating said address-error counter value comprises resetting said address-error counter to a predetermined value if said packet passes said error check.

5. The method of claim 3, wherein updating said address-error counter value comprises, if said packet is determined to be erroneous, updating said address-error counter value to reflect a number of occurrences of the address sequence of said acquired packet.

6. The method of claim 3 comprising determining that said acquired packet is noise-related if said address-error counter value reaches a predetermined limit value.

7. The method of claim 3 comprising switching to an acquisition mode of operation if said address-error counter value reaches a predetermined limit value.

8. The method of claim 1 comprising updating a timestamp of a stored address sequence that matches the address sequence of said acquired packet.

9. The method of claim 8, comprising flushing one or more address sequences stored in the address list based on the time stamp.

10. The method of claim 1, wherein switching to said acquisition mode of operation comprises switching to said acquisition mode of operation before receiving a data portion of said acquired packet.

11. An apparatus comprising:
a media access control (MAC) module; and
a receiver to acquire an address sequence of an acquired packet transmitted over a communication channel and to receive the acquired packet based on a determination made by the MAC module,
wherein the MAC module comprises:
a memory to store address sequences of acquired packets in an address list; and
an address checker to compare the address sequence with one or more address sequences of previously-acquired packets stored in the address list and to determine whether the address sequence of said acquired packet is erroneous, if the address sequence of the packet matches one of said one or more address sequences stored in the address list,
wherein the address sequence is stored in the address list, if the address sequence does not match any one of said one or more address sequences previously stored in the address list.

12. The apparatus of claim 11, wherein the MAC module further comprises a packet checker to perform an error check of the packet.

13. The apparatus of claim 11, wherein said address checker is able to switch the receiver to an acquisition mode of operation if said acquired packet is determined to be erroneous.

14. The apparatus of claim 11, wherein said address checker is able to switch the receiver to an acquisition mode of operation if the address sequence of said acquired packet does not match any one of said one or more address sequences stored in the address list.

15. The apparatus of claim 11, wherein said address checker is able to update said memory with the address sequence of said acquired packet as an address sequence of a previously acquired packet in the address list if the address sequence of said acquired packet does not match any one of said one or more stored address sequences.

16. The apparatus of claim 11, wherein said memory is able to store one or more time-stamps corresponding to one or more of said stored address sequences, respectively.

17. The apparatus of claim 16, wherein said address checker is able to update a time-stamp of a stored address sequence corresponding to the address sequence of said acquired packet.

18. The apparatus of claim 16, wherein said address checker is able to selectively delete one or more of said stored address sequences based on the value of the time stamp of said stored address sequences.

19. The apparatus of claim 11, wherein said memory is able to store one or more address-error counter values corresponding to one or more of said stored address sequences, respectively.

20. The apparatus of claim 19, wherein said address checker is able to, based on an error check of said acquired packet, update an address-error counter value corresponding to a stored address sequence matching the address sequence of said acquired packet.

21. The apparatus of claim 20, wherein said address checker is able to determine that said acquired packet is noise-related if said address-error counter value reaches a predetermined limit value.

22. The apparatus of claim 20, wherein said address checker is able to reset said address-error counter value to a predetermined default value if said packet passes said error check.

23. The apparatus of claim 20, wherein said address checker is able to update said address-error counter value to reflect an occurrence of the address sequence of said acquired packet if said acquired packet fails said error check.

24. The apparatus of claim 19, wherein said address checker is able to switch the receiver to an acquisition mode of operation if an address-error counter value corresponding to a stored address sequence matching the address sequence of said acquired packet reaches a predetermined limit value.

25. A wireless communication system comprising:
a communication device comprising:
a media access control (MAC) module; and
a receiver to acquire an address sequence of an acquired packet transmitted over a communication channel and to receive the acquired packet based on a determination made by the MAC module,
wherein the MAC module comprises:
a memory to store address sequences of acquired packets in an address list; and
an address checker to compare the address sequence with one or more address sequences of previously-acquired packets stored in the address list and to determine whether the address sequence of said acquired packet is erroneous, if the address sequence of the packet matches one of said one or more address sequences stored in the address list,
wherein the address sequence is stored in the address list, if the address sequence does not match any one of said one or more address sequences previously stored in the address list.

26. The system of claim 25 comprising another communication device able to transmit said packet.

27. The system of claim 25, wherein the MAC module further comprises a packet checker to perform an error check of the packet.

28. An article comprising a storage medium having stored thereon instructions that, when executed, result in:
acquiring, by a communication device, an address sequence of an acquired packet transmitted over a communication channel; and
determining whether to receive the acquired packet by:
comparing the address sequence with one or more address sequences of previously-acquired packets stored in an address list;
receiving said acquired packet and determining whether the address sequence of said acquired packet is erroneous, if the address sequence of the packet matches one of said one or more address sequences stored in the address list; and
storing the address sequence in the list and switching to an acquisition mode of operation, if the address sequence does not match any one of said one or more address sequences stored in the address list.

29. The article of claim 28, wherein the instructions further result in performing an error check of the acquired packet after receiving the packet.

30. A wireless communication device comprising:
one or more antennas able to acquire a packet;
a media access control (MAC) module; and
a receiver to acquire an address sequence of an acquired packet transmitted over a communication channel and to receive the acquired packet based on a determination made by the MAC module,
wherein the MAC module comprises:
a memory to store address sequences of acquired packets in an address list; and
an address checker to compare the address sequence with one or more address sequences of previously-acquired packets stored in the address list and to determine whether the address sequence of said acquired packet is erroneous, if the address sequence of the packet matches one of said one or more address sequences stored in the address list,
wherein the address sequence is stored in the address list, if the address sequence does not match any one of said one or more address sequences previously stored in the address list.

31. The device of claim 30, wherein the MAC module further comprises a packet checker to perform an error check of the packet.

* * * * *